United States Patent
Gritsch

(10) Patent No.: US 11,201,468 B2
(45) Date of Patent: Dec. 14, 2021

(54) REDUNDANT POWER SUPPLY NETWORK AND WATER VEHICLE WITH REDUNDANT POWER SUPPLY NETWORK AS ONBOARD NETWORK

(71) Applicant: Siemens Aktiengesellschaft, Munich (DE)

(72) Inventor: Christian Gritsch, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 34 days.

(21) Appl. No.: 16/530,589

(22) Filed: Aug. 2, 2019

(65) Prior Publication Data
US 2020/0044443 A1    Feb. 6, 2020

(30) Foreign Application Priority Data

Aug. 3, 2018   (EP) .................................... 18187213

(51) Int. Cl.
| | |
|---|---|
| H02J 3/38 | (2006.01) |
| H02J 4/00 | (2006.01) |
| H02J 1/10 | (2006.01) |
| H02M 3/156 | (2006.01) |
| H02J 1/12 | (2006.01) |

(52) U.S. Cl.
CPC ............. H02J 1/102 (2013.01); H02J 1/12 (2013.01); H02M 3/156 (2013.01)

(58) Field of Classification Search
CPC ............ H02J 1/102; H02J 1/12; H02M 3/156
See application file for complete search history.

(56) References Cited

U.S. PATENT DOCUMENTS

| | | | |
|---|---|---|---|
| 5,844,329 A | 12/1998 | Bailey et al. | |
| 9,362,838 B1 | 6/2016 | Balogh et al. | |
| 2004/0069251 A1* | 4/2004 | Rzadki | B63H 21/17 |
| | | | 123/3 |
| 2010/0193630 A1* | 8/2010 | Duces | H02J 4/00 |
| | | | 244/58 |
| 2014/0203738 A1* | 7/2014 | Yamazaki | H01M 10/425 |
| | | | 318/139 |

(Continued)

FOREIGN PATENT DOCUMENTS

| | | |
|---|---|---|
| CN | 202121373 U | 1/2012 |
| DE | 10 2012 203 820 A1 | 9/2013 |

(Continued)

*Primary Examiner* — Jared Fureman
*Assistant Examiner* — Esayas G Yeshaw
(74) *Attorney, Agent, or Firm* — Henry M. Feiereisen LLC

(57) ABSTRACT

A redundant power supply network includes an alternating voltage network and a first incoming-feed power converter with a first dc link and a second incoming-feed power converter with a second dc link. The first and second incoming-feed power converters are each connected on an alternating voltage side with the alternating voltage network. A first power source is connected to the first dc link and a second power source is connected to the second dc link. A mains switch is arranged between the first incoming-feed power converter and the alternating voltage network, and a dc link switch connects the first and second dc links. A connection to a terminal for an external network is arranged between the first incoming-feed power converter and the mains switch.

12 Claims, 4 Drawing Sheets

(56) References Cited

U.S. PATENT DOCUMENTS

2015/0344117 A1    12/2015  Hartig et al.
2017/0373502 A1*   12/2017  Gjerpe ..................... H02J 4/00

FOREIGN PATENT DOCUMENTS

| GB | 2259199 A | 3/1993 |
| RU | 2446541 C1 | 3/2012 |
| SU | 1262624 A1 | 10/1986 |
| WO | WO 01/11765 A1 | 2/2001 |

* cited by examiner

REDUNDANT POWER SUPPLY NETWORK AND WATER VEHICLE WITH REDUNDANT POWER SUPPLY NETWORK AS ONBOARD NETWORK

CROSS-REFERENCES TO RELATED APPLICATIONS

This application claims the priority of European Patent Application, Serial No. 18187213.6, filed Aug. 3, 2018, pursuant to 35 U.S.C. 119(a)-(d), the disclosure of which is incorporated herein by reference in its entirety as if fully set forth herein.

BACKGROUND OF THE INVENTION

The present invention relates to a redundant power supply network, to a water vehicle with a redundant power supply network as onboard network, and to a method for connecting a redundant power supply network to an external network.

The following discussion of related art is provided to assist the reader in understanding the advantages of the invention, and is not to be construed as an admission that this related art is prior art to this invention.

Power supply networks are used to supply power to electrical loads. Such a power supply network is often designed redundantly for important loads. Thus, the power supply network can still reliably provide electrical power when one or more components fail. This is the case, for instance, for electrical loads on vehicles, in particular for water vehicles such as ships. It is necessary for critical electrical loads to be supplied from a redundant power supply network particularly while the ship is travelling.

The loads are supplied with electrical power by way of an alternating voltage network. The redundant power supply network is fed from two power sources. The power sources may involve pure power generators, e.g. generators which are operated on a combustion engine, or power storage units such as batteries. These power storage units are able to not only provide electrical power but also absorb and store power. On a ship, it is also possible to use shaft generators as power sources. Mechanical power is hereby taken from the drive shaft, i.e. the ship's shaft, of the ship by a generator and fed to the power supply network. The power source frequently includes a power converter, so that the power source can be connected to a dc link of an incoming-feed power converter.

The incoming-feed power converter is arranged between the power source and an alternating voltage network. This makes it possible to control or regulate a power exchange between the power source and the alternating voltage network. Requirements with respect to system disturbances in the alternating voltage network are met and the alternating voltage network can be formed by means of voltage and frequency.

In addition, it may be necessary to connect the alternating voltage network to an external network instead of the power sources and to supply the alternating voltage network with electrical power from the external network. This may be required for maintenance purposes, or for vehicles that stand in a depot, where operation of a diesel engine is not permitted. The same applies to ships, in which operation of a diesel engine is prohibited in certain areas for environmental reasons. The alternating voltage network should then be supplied with electrical power via an external network, also known as an onshore feed, onshore terminal or onshore network. For this purpose, a further power converter is then provided, which controls or regulates the power exchange between the external network and the alternating voltage network.

It would be desirable and advantageous to provide an improved redundant power supply network to obviate prior art shortcomings and to improve a feed via an external network.

SUMMARY OF THE INVENTION

According to one aspect of the present invention, a redundant power supply network includes an alternating voltage network, a first incoming-feed power converter with a first dc link and a second incoming-feed power converter with a second dc link, each of the first and second incoming-feed power converters being connected on an alternating voltage side with the alternating voltage network, a first power source connected to the first dc link, a second power source connected to the second dc link, a mains switch arranged between the first incoming-feed power converter and the alternating voltage network, a dc link switch configured to connect the first and second dc links, a terminal for an external network, and a connection to the terminal for the external network, the connection being arranged between the first incoming-feed power converter and the mains switch.

According to another aspect of the present invention, a water vehicle includes an onboard network configured as a redundant power supply network, the redundant power supply network including an alternating voltage network, a first incoming-feed power converter with a first dc link and a second incoming-feed power converter with a second dc link, each of the first and second incoming-feed power converters being connected on an alternating voltage side with the alternating voltage network, a first power source connected to the first dc link, a second power source connected to the second dc link, a mains switch being arranged between the first incoming-feed power converter and the alternating voltage network, a dc link switch configured to connect the first and second dc links, a terminal for an external network, and a connection to the terminal for the external network, the connection being arranged between the first incoming-feed power converter and the mains switch.

According to still another aspect of the present invention, a method for connecting a redundant power supply network with an external network includes closing a dc link switch configured to connect first and second dc links of first and second incoming-feed power converters of the redundant power supply network, opening a mains switch of the redundant power supply network arranged between the first incoming-feed power converter and an alternating voltage network of the redundant power supply network, and after opening the mains switch, connecting the external network in an electrically conducting manner to the first incoming-feed power converter.

The present invention surprisingly recognizes that using the first incoming-feed power converter for the connection with the external network easily ensures the supply from the external network without additional power converters. To this end, a switch which separates the first incoming-feed power converter from the alternating voltage network only needs to be present between the alternating voltage network and the first incoming-feed power converter. In order to be able to differentiate this switch from other switches, it is referred to as the mains switch. After opening the mains switch, an electrically conducting connection can be established between the first incoming-feed power converter and the external network by way of the connection to a terminal for an external network. This can be realized for example by connecting the external network to the terminal by way of a cable and associated plug. It is likewise possible to establish the connection between the network and the terminal even before opening the mains switch and after opening the mains switch to close a switch disposed in the connection to the terminal and thus to establish the electrically conducting connection. In order for a power exchange to be able to materialize between the external network and the alternating voltage network, the dc links of the first and second incoming-feed power converters must be connected to one another. This can advantageously realized by using a switch. In order to be able to differentiate this switch from other switches, this switch is referred to as the dc link switch.

The alternating voltage network can be embodied as a single or multi-phase network. In particular, a three-phase current has proven useful for supplying electrical loads and has established itself on the market.

A particular advantage resides in the fact that the process of connecting the external network is carried out without interruption, i.e. the onboard network is supplied continuously. Thus, due to the supply from an external network, the power sources can still also be operated continuously both as motors and also as generators.

Synchronization of the voltage and frequency from the first incoming-feed power converter with the voltage and frequency of the external network can be realized both before establishing the electrical connection with the external network and after establishing the electrical connection. When synchronization takes place after establishing the electrical connection with the external network, the first incoming-feed power converter shall be blocked upon connection with the external network so as to avoid unwanted compensation processes between the components of the redundant power supply network and the external network.

The first incoming-feed power converter for the feed via the external network may also be referred to as regrouping, i.e. regrouping of the power converters with the connection of the dc links allows the existing incoming-feed power converters to be converted to form power coupling converters and thus enable a supply by an external network, in particular an onshore terminal, without additional inverter hardware. This requires only the provision of a switchable connection between the dc links of the incoming-feed power converters and a switch in order to separate the first incoming-feed power converter from the alternating voltage network.

While regrouping causes loss of redundancy in the power supply when power converters are concerned, high reliability is still realized in the power supply due to the external network.

The use of the redundant power supply network on a water vehicle, such as ship, is particularly advantageous. Since a ship is in most instances structured with two channels for redundancy reasons so as to ensure a safe power supply, there is oftentimes the need for providing a portside power converter and a starboard power converter. This dual channel ensures a reliable power supply while the ship is travelling, i.e. during operation of the ship. However, the need for a dual channel is not absolutely necessary in a port. In other words, it is possible to dispense with a redundant feed into the alternating voltage network in the port. Redundancy with respect to sources still exists. The redundant power supply network is therefore especially suited for a ship, since, during operation, it ensures redundancy at sea and at the same time using the incoming-feed power converters enables a feed from an external network without further power converters, and in this way dispenses with redundancy when it is not needed. In other words, the degree of freedom obtained by the loss of redundancy in the feed is used for regrouping the power converter by connecting the first dc link and the second dc link to one another via an intermediate dc switch. The dc link switch can be embodied as contactor or separator. For this reason, the redundant power supply network is especially suited as onboard network of a ship.

The lesser feed power into the alternating voltage network encountered by the supply via the external network as a result of feeding only one incoming-feed power converter into the alternating voltage network, is insignificant since in the port the required power is reduced in the onboard network.

By regrouping the incoming-feed power converters, existing network filters of these power converters may be used. The need for further network filters, as would be required when using further power converters, is eliminated, resulting in cost savings, reduced weight and less installation space of the power supply network.

Furthermore, the redundant power supply can be used advantageously in stand-alone systems. In the presence of two incoming-feed power converters, a grid-linked operation can generally be performed by regrouping. Thus, stand-alone systems can be connected to the interconnected system as an external network when encountering a power surplus. A redundancy in the power generation is no longer absolutely necessary in view of the surplus power. At the same time, a reliable power supply is ensured by the connection to an external network, when depletion of the power source or sources is imminent.

According to another advantageous feature of the present invention, the first power source and the second power source can each be embodied as a shaft generator. When configuring the onboard network of a ship as a redundant power supply network, many of the following advantageous applications can i.a. be realized.

In a first scenario, the ship reaches a port and docks, with the main drives of the shaft generator still switched on. The first incoming-feed power converter is firstly separated from the ship's network, i.e. the alternating voltage network. The second incoming-feed power converter continuously supplies the alternating voltage network from the second power source, i.e. one of the shaft generators. Then, without specifying any particular order, the dc link switch is closed, the first incoming-feed power converter is synchronized with the onshore network as an external network, and the connection with the onshore network is established. This can be implemented by establishing a connection, for example by plugging in a cable or by closing a connection switch. The shaft generators may hereby stay operational even after connection with the external network, for example in order to assist in the positioning of the ship.

The following application is possible as a second scenario. Before reaching the port, the main drive, which oftentimes involves a less environmentally friendly combustion engine, is switched off and smaller, cleaner diesel engines are switched on. The shaft generator is now used to motorically drive the ship. The power source therefore temporarily represents a power sink and the shaft generator becomes the drive. The power flow is transferred from the alternating voltage network to the shaft generator, which is now motor-driven. When the ship reaches the dock, the shaft generators which run motorically can be switched off and one of the first incoming-feed power converters is separated from the onboard network and the connection is established with the onshore network, as described above with reference to the first scenario. It is hereby advantageous that the shaft generators can stay operational so as to assist in the positioning of the ship. In this way, a particular environmentally friendly operation can be achieved in the vicinity of the port. Adhering to strict emission regulations, particularly within the country's territories or in the vicinity of the port, is also easily possible as a result of redundant power supply network according to the present invention.

According to another advantageous feature of the present invention, at least one of the first and second power sources can be embodied as a power storage unit, e.g. a battery. As described above, the first incoming-feed power converter is again separated from the onboard network, or in general from the alternating voltage network. The first incoming-feed power converter is connected on the alternating voltage side via the connection to a terminal for an external network with the external network, for example the onshore network. The first incoming-feed power converter is synchronized similar to the procedures described with the onshore network or the external network. Thus, the onshore network is able to not only charge the battery but at the same time a voltage for the alternating voltage network is generated and maintained with the second incoming-feed power converter remaining on the onboard power supply. This embodiment is particularly suited for a ship, which is operated electrically. The power storage units may involve storages, which are provided exclusively or partially for the supply of the electrical drive motors.

According to another advantageous feature of the present invention, a connection switch can be disposed in the connection to the terminal for the external network. The connection switch is, as described above, not absolutely necessary. However, the connection switch controls the connection of the external network via a closed-loop control. The connection with the external network can therefore be established as a function of the synchronization of the incoming-feed power converter. Feedback contacts of the switch Inform the closed-loop control whether or not the external network is connected to the first incoming-feed power converter. Thus, the process of connecting the external network can be easily automated, for example by using a closed-loop control of an incoming-feed power converter or both incoming-feed power converters.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
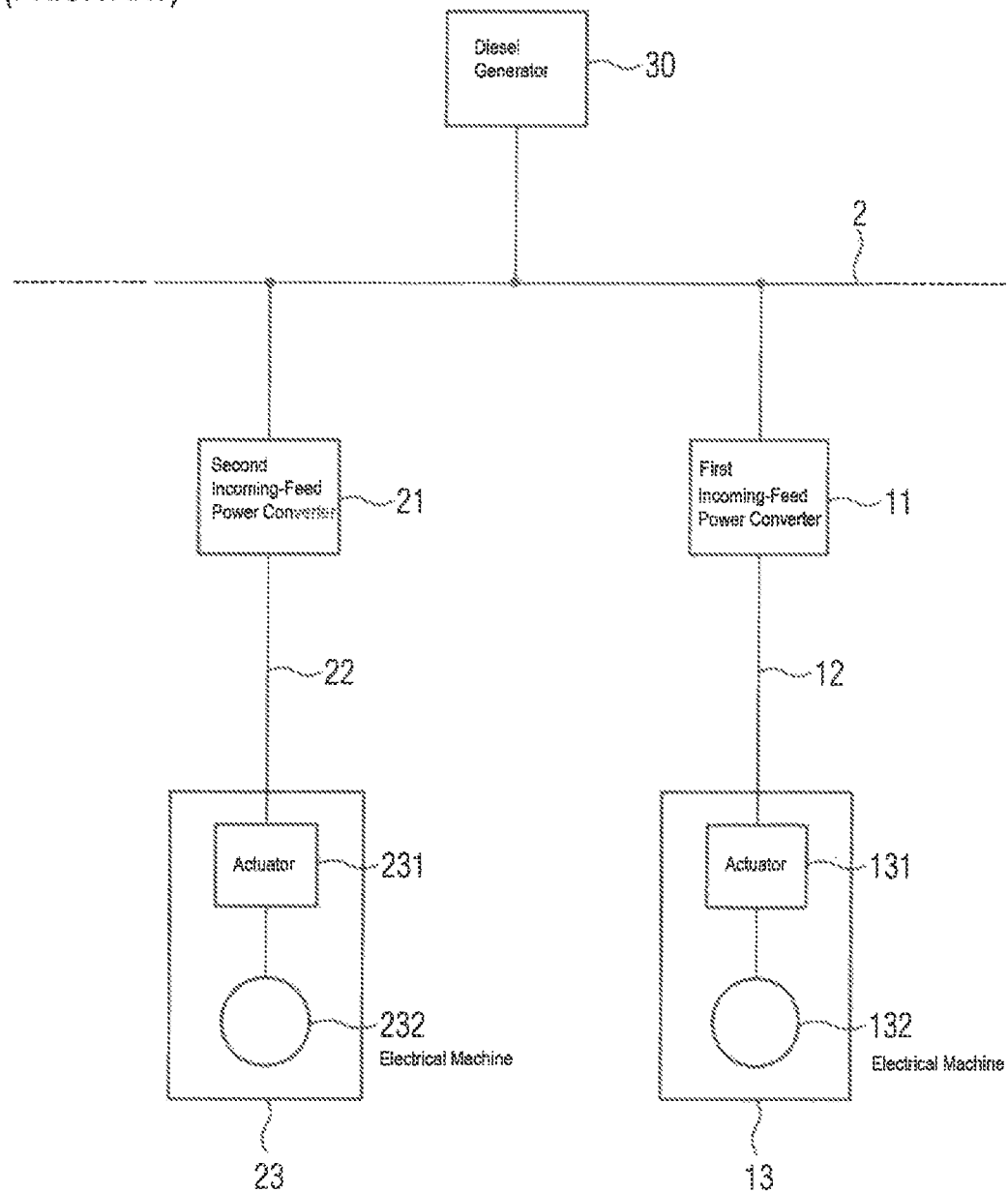
FIG. 1 is a schematic illustration of a conventional power supply network.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

FIG. 1 shows a conventional power supply network in which an alternating voltage network 2 for supplying electrical loads, not shown, is supplied with electrical power from a first power source 13 and a second power source 23. Power is supplied via two phases. Each phase has an incoming-feed power converter 11, 21, a dc link 12, 22 and the power source 13, 23. The power sources 13, 23 are connected to the first and second dc links 12, 22 of the incoming-feed power converters 11, 21, respectively. The power sources 13, 23 have each an actuator 131, 231 in addition to an electrical machine 132, 232. The actuators 131, 231 are able to convert an alternating voltage provided by the electrical machines 132, 232 into direct voltage, so that the power sources 13, 23 can be connected to the dc links 12, 22, respectively. The alternating voltage network can be formed by one or more incoming-feed power converters 11, 21. In this example, a first incoming-feed power converter 11 and a second incoming-feed power converter 21 are shown, which can control or regulate an exchange of power between the power sources 13, 23 connected thereto and the alternating voltage network 2. The arrangement of the two phases provides a redundancy, which when one of the components in the phase fails, enables supply of the alternating voltage network 2 with power by way of the other phase.

In addition to the power supply from the two power sources 13, 23, the alternating voltage network 2 can, additionally or alternatively, also be fed from a diesel generator 30.

When connecting such a power supply network to an external network, a further power converter is arranged on one of the dc links 12, 22 for connecting the external network to the dc link 12, 22, or the external network can also be connected to the power supply network between the actuators 131, 231 and the electrical machines 132, 232. The actuator 131 or 231 can then assume the task of connecting the external network with the dc links 12, 22 and feed power into the alternating voltage network 2. The electrical machine 132, 232 in this phase must then be separated from the power supply network using a switch, for example.

Figure 2:
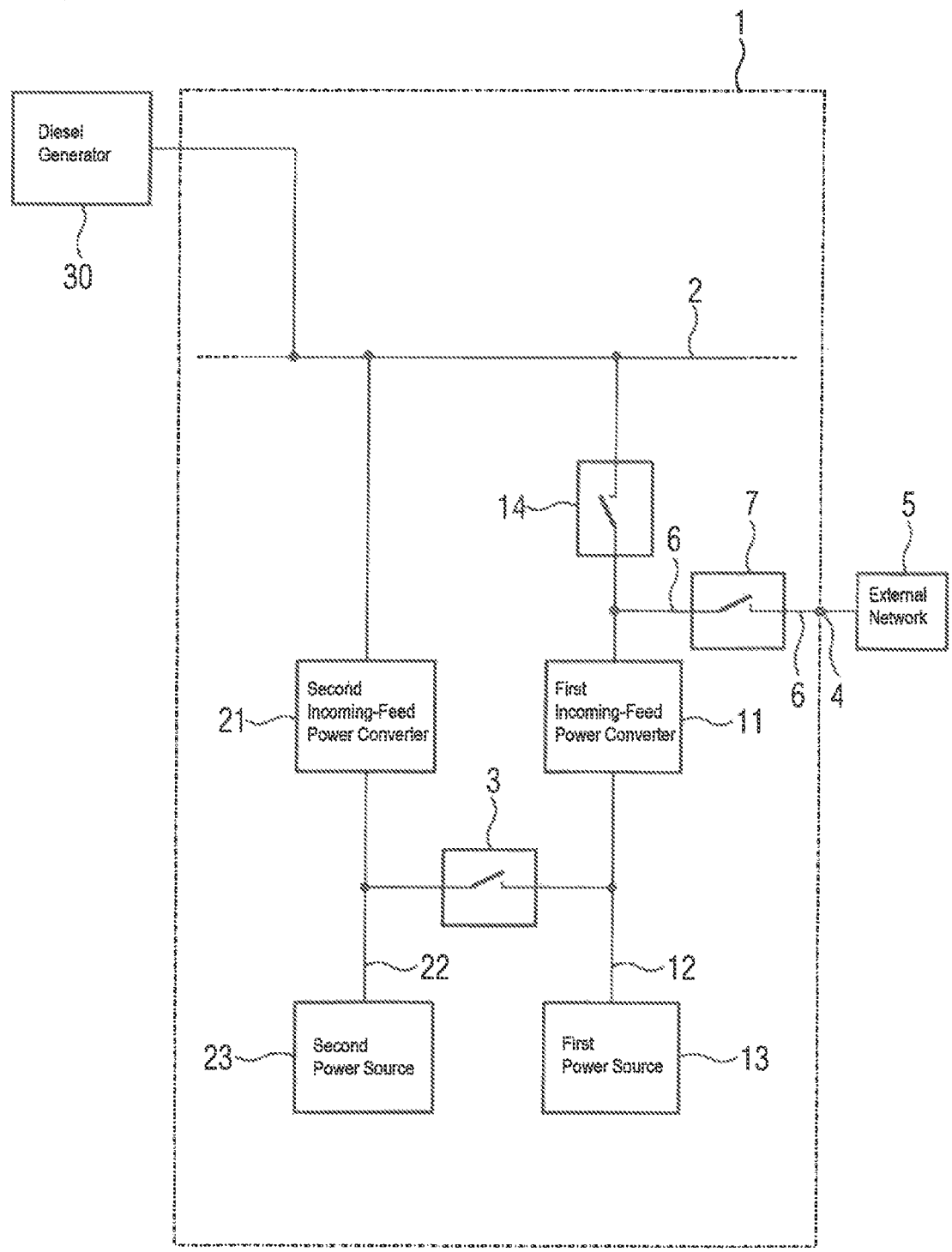
FIG. 2 is an exemplary embodiment of a redundant power supply network with a terminal for an external network in accordance with the present invention.

Turning now to FIG. 2, there is shown a schematic illustration of a redundant power supply network 1 in accordance with the present invention. For ease of understanding, parts corresponding with those in FIG. 1 are denoted by identical reference numerals and not explained again to also avoid repetitions. The description below will center on the differences between the conventional power supply network and the redundant power supply network 1 according to the present invention. Provision is made in the redundant power supply network 1 for a terminal 4 for an external network 5 and a mains switch 14, which is arranged between the alternating voltage network 2 and the first incoming-feed power converter 11. A further mains switch (not shown) can be arranged between the alternating voltage network 2 and the second incoming-feed power converter 21. The redundant power supply network 1 can regroup using the mains switch 14 and a connection switch 7, which is arranged between the terminal 4 for the external network 5 and a connection between the mains switch 14 and first incoming-feed power converter 11, such that power can be fed from the external network 5 by way of the first incoming-feed power converter 11 and the second incoming-feed power converter 21 into the alternating voltage network 2. The first incoming-feed power converter 11 and the second incoming-feed power converter 21 together form a network coupling inverter.

To ensure a power exchange between the alternating voltage network 2 and the external network 5, the first dc link 12 and the second dc link 22 are connected to one another in contrast to the conventional power supply network of FIG. 1. For this purpose, a dc link switch 3 is arranged between the first dc link 12 and the second dc link 22. The connection switch 7 is opened in a redundant power supply of the alternating voltage network 2 from the power sources 13, 23. There is no need to maintain the dc link switch 3 open, so that the power supply is carried out redundantly from the power sources 13, 23 and an error in one phase does not affect the other phase. To connect the external network 5, the external network 5 is connected to the terminal 4, the dc link switch 3 is closed, and the mains switch 14 is opened. When the first power source 13 shall remain operational, the dc link switch 3 must be closed before the mains switch 14 is opened, so that power can be taken from the first power source 13. After opening the mains switch 14, the connection switch 7 can be closed. As a result, the external network 5 is connected to the alternating voltage network 2. Care should be taken to ensure that this connection is carried out without interruption. None of the power sources 13, 23 has to be switched off for this connection.

A redundant power supply network 1 in accordance with the present invention is particularly advantageous for a ship which is operated in a port or in its vicinity with an environmentally friendly diesel generator 30. A diesel drive unit 31 (FIG. 6), not shown in FIG. 2, for driving the ship's propeller can be shut down, since less drive power is required in the vicinity of the port or in the port. Such a diesel drive unit 31 is far less environmentally friendly. The power sources 13, 23, which are embodied as shaft generators, can take electrical power from the alternating voltage network 2 and thus drive the ship shaft 32 (FIG. 6), not shown in FIG. 2. A connection of the external network 5 is also possible in this operation, since the power sources 13, 23 can remain switched on. The power sources 13, 23 may also be used in the port to keep the ship in a desired position. As soon as the external network 5 is connected to the redundant power supply network 1, the diesel generator 30 can also be switched off and the two shaft generators can remain in operation during and after this procedure.

The redundant power supply network 1 can be expanded by providing further switches, in particular a further mains switch, so as to be able to interrupt a power exchange between the alternating voltage network 2 and a power source 13, 23 or power storage unit, in particular second power source 23. This may be useful inter glia to protect components in the power supply network 1.

Figure 3:
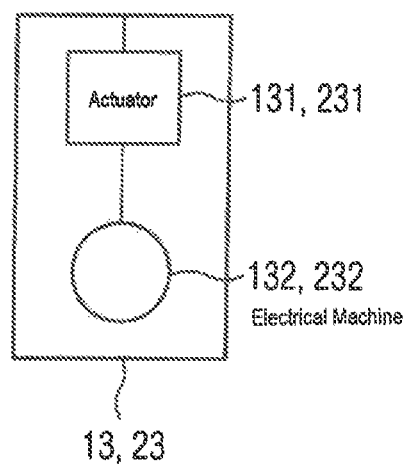
FIG. 3 is a schematic illustration of one embodiment of a power source.

FIG. 3 is a schematic illustration of an exemplary embodiment for the power source 13 or power source 23. In addition to electrical machine 132, 232, the power source 13, 23 includes an actuator 131, 231 to enable adjustment of the voltage of the electrical machine 132, 232 to the dc link 12, 22, i.e. to convert an alternating voltage into a direct voltage. The electrical machine 132, 232 can hereby be operated as a generator and as a motor. Operation as a generator occurs, for example, when the electrical machine 132, 232 is coupled to a combustion engine. A further example is a ship, with the electrical machine 132, 232 representing a shaft generator in a ship, with the electrical machine 132, 232 operating as a generator taking mechanical power from the drive shaft of the ship and feeding the mechanical power into the onboard network, i.e. the alternating voltage network 2. A low-power operation is also possible, in which the drive power is taken from the alternating voltage network 2 and fed via one or more shaft generators of the drive shaft, i.e. the ship shaft 32, to the ship's propeller 33 of the ship.

Another option involves a coupling of the electrical machine 132, 232 to a rotating mass and thus to operate a rotating mass storage device, which can both take electrical power from the alternating voltage network 2 and also feed it thereto.

Figure 4:
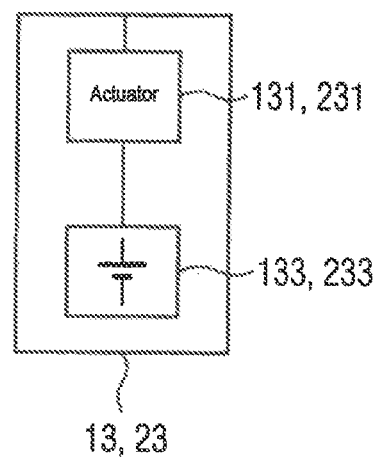
FIG. 4 is a schematic illustration of another embodiment of a power source.

FIG. 4 shows a battery storage device as a power source 13, 23. In this way the battery 133, 233 can be connected to the dc link 12, 22 by way of actuator 131, 231. The actuator 131, 231 represents a DC/DC actuator in this case. The battery can be easily charged by way of the redundant power supply network 1 via connection with the external network 5. This application is particularly advantageous for vehicles, in particular water vehicles. The power stored in the battery 133, 233 can be used not only to feed the onboard network of the vehicle but also to take the power for the drive. There is an increasing demand on the market for electrically-driven vehicles, which can be easily charged in this way via an external network 5 without causing an interruption in the onboard network.

Figure 5:
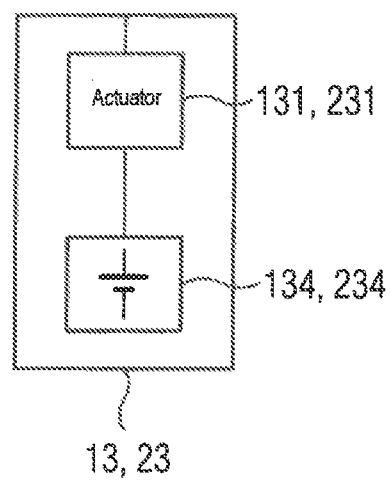
FIG. 5 is a schematic illustration of still another embodiment of a power source.

FIG. 5 shows another exemplary embodiment for the power source 13, 23. In this example, a capacitor bank 134, 234 is used instead of batteries 133, 233. To avoid repetition, reference is made to the description relating to FIG. 4. Capacitors can provide significantly higher electrical outputs compared with a battery. This application is suited in particular for vehicles, in which a high power, for example for acceleration, must be generated briefly. For this purpose, the capacitor bank 134, 234 can be used, which is then charged from the alternating voltage network 2 or from the external network 5 when the vehicle is at a standstill.

Figure 6:
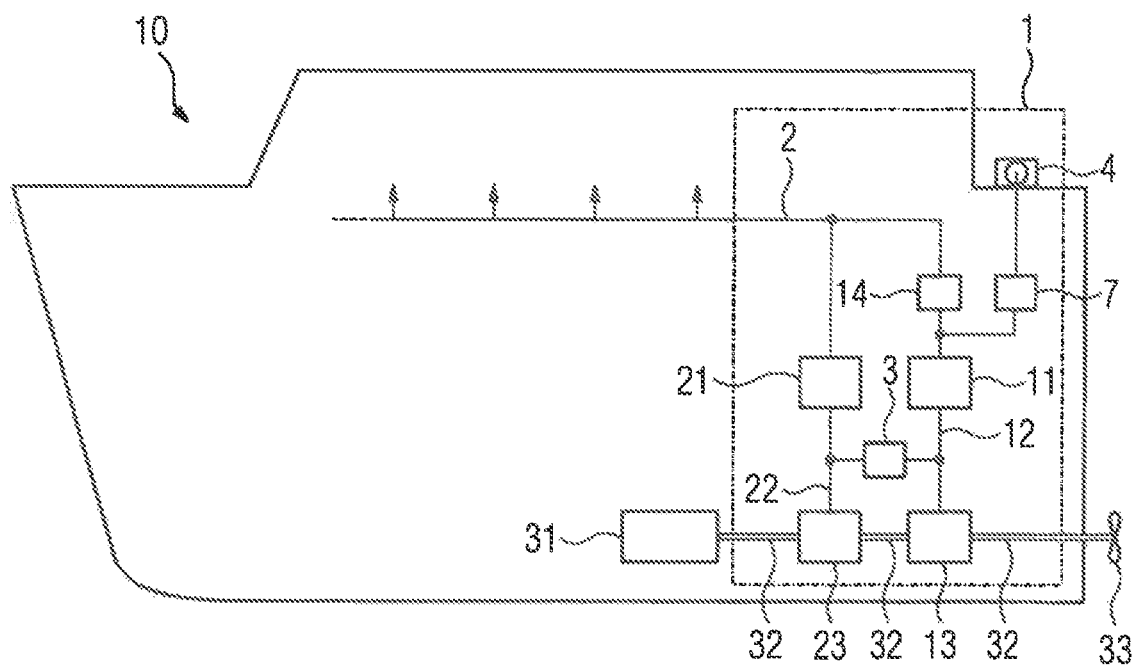
FIG. 6 is a schematic illustration of a ship equipped with a redundant power supply network with a terminal for an external network in accordance with the present invention.

Turning now to FIG. 6, there is shown a schematic illustration of a water vehicle 10 equipped with a redundant power supply 1 in accordance with the present invention. To avoid repetition, reference is made to the description relating to FIG. 2 and parts corresponding with those in FIG. 2 are denoted by identical reference numerals. The power sources 13, 23 are embodied as shaft generators, which can both take electrical power introduced by a drive diesel unit 31 from the ship's shaft 32 and can also drive the ship's shaft 32 and thus the ship's propeller 33. Thus, the drive diesel unit 31 can be shut down at least temporarily, e.g. when the water vehicle 10 is in a port. The terminal 4 can be connected in a port with an onshore network as an external network 5. Reference is made to the description relating to FIG. 2 to describe the connection of the supply by way of the onshore network as an external network 5. Arrows on the alternating voltage network 2 identify the outflows to the individual electrical loads of the onboard network of the ship.

The first phase with the first incoming-feed power converter 11, first dc link 12, and first power source 13 is advantageously arranged on the one side (starboard or portside) of the ship in order to ensure a high degree of redundancy, while the second phase with the second incoming-feed power converter 21, second dc link 22 and second power source 23 is arranged on the opposite side (portside or starboard) of the ship.

In summary, the invention relates to a redundant power supply network 1 having a first incoming-feed power converter 11 with a first dc link 12 and a second incoming-feed power converter 21 with a second dc link 22, a first power source 13 and a second power source 23, an alternating voltage network 2, and a terminal 4 for an external network 5, wherein the first and second incoming-feed power converters 11, 21 are each connected on an alternating voltage side to the alternating voltage network 2, wherein the first power source 13 is connected to the first dc link 12 and the second power source 23 is connected to the second dc link 22. To improve the redundant power supply network 1 with respect to a feed via the external network 5, provision is made for arranging mains switch 14 between the first incoming-feed power converter 11 and the alternating voltage network 2, with the first dc link 12 and the second dc link 22 being connectable to one another by dc link switch 3. A connection to the terminal 4 for the external network 5 is arranged between the first incoming-feed power converter 11 and the mains switch 14. The invention further relates to a water vehicle 10 with an onboard network, with the onboard network being configured as a redundant power supply network 1. Furthermore, the invention relates to a method for connecting the redundant power supply network 1 to an external network 5.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A redundant power supply network, comprising:
    an alternating voltage network;
    a first incoming-feed power converter with a first dc link and a second incoming-feed power converter with a second dc link, each of the first and second incoming-feed power converters being connected on an alternating voltage side with the alternating voltage network;
    a first power source connected to the first dc link;
    a second power source connected to the second dc link;
    a mains switch arranged between the first incoming-feed power converter and the alternating voltage network;
    a dc link switch configured to directly connect the first and second dc links;
    a terminal for an external network; and
    a connection to the terminal for the external network, said connection being arranged between the first incoming-feed power converter and the mains switch.

2. The redundant power supply network of claim 1, wherein the first power source and the second power source are each embodied as a shaft generator.

3. The redundant power supply network of claim 1, wherein at least one of the first and second power sources is embodied as a power storage unit.

4. The redundant power supply network of claim 3, wherein the power storage unit is a battery.

5. The redundant power supply network of claim 1, further comprising a connection switch disposed in the connection to the terminal for the external network.

6. A water vehicle, comprising an onboard network configured as a redundant power supply network, said redundant power supply network comprising an alternating voltage network, a first incoming-feed power converter with a first dc link and a second incoming-feed power converter with a second dc link, each of the first and second incoming-feed power converters being connected on an alternating voltage side with the alternating voltage network, a first power source connected to the first dc link, a second power source connected to the second dc link, a mains switch being arranged between the first incoming-feed power converter and the alternating voltage network, a dc link switch configured to directly connect the first and second dc links, a terminal for an external network, and a connection to the terminal for the external network, said connection being arranged between the first incoming-feed power converter and the mains switch.

7. The water vehicle of claim 6, wherein the first power source and the second power source are each embodied as a shaft generator.

8. The water vehicle of claim 6, wherein at least one of the first and second power sources is embodied as a power storage unit.

9. The water vehicle of claim 8, wherein the power storage unit is a battery.

10. The water vehicle of claim 6, wherein the redundant power supply network includes a connection switch disposed in the connection to the terminal for the external network.

11. A method for connecting a redundant power supply network with an external network, said method comprising:
    closing a dc link switch configured to directly connect first and second dc links of first and second incoming-feed power converters of the redundant power supply network;
    opening a mains switch of the redundant power supply network arranged between the first incoming-feed power converter and an alternating voltage network of the redundant power supply network; and
    after opening the mains switch, connecting the external network hi an electrically conducting manner to the first incoming-feed power converter.

12. The method of claim 11, further comprising closing a connection switch of the redundant power supply network in a connection to a terminal for the external network to thereby connect the external network to the first incoming-feed power converter in an electrically conducting manner.

* * * * *